US00RE49109E

(19) United States
(12) Reissued Patent
Wirick et al.

(10) Patent Number: US RE49,109 E
(45) Date of Reissued Patent: Jun. 14, 2022

(54) SYSTEM AND METHOD FOR MULTISCREEN NETWORK DIGITAL VIDEO RECORDING USING ON-DEMAND TRANSCODING

(71) Applicant: ARRIS Enterprises LLC, Suwanee, GA (US)

(72) Inventors: Kevin S. Wirick, Olivenhain, CA (US); Michael A. Casteloes, Poway, CA (US); Wendell Sun, San Diego, CA (US)

(73) Assignee: ARRIS Enterprises LLC, Suwanee, GA (US)

(21) Appl. No.: 16/932,538

(22) Filed: Aug. 25, 2020

Related U.S. Patent Documents

Reissue of:
(64) Patent No.: 10,027,993
Issued: Jul. 17, 2018
Appl. No.: 13/857,519
Filed: Apr. 5, 2013

U.S. Applications:
(60) Provisional application No. 61/798,554, filed on Mar. 15, 2013.

(51) Int. Cl.
*H04N 21/231* (2011.01)
*H04N 19/40* (2014.01)
(Continued)

(52) U.S. Cl.
CPC ..... *H04N 21/231* (2013.01); *G11B 20/1262* (2013.01); *H04N 19/40* (2014.11);
(Continued)

(58) Field of Classification Search
CPC ..... H04N 21/23439; H04N 21/231; H04N 21/2747; H04N 21/40; H04N 21/44029;
(Continued)

(56) References Cited

U.S. PATENT DOCUMENTS 7,877,468 B2 11/2011 Abadir et al.
8,644,678 B2 2/2014 Smith et al.
(Continued)

FOREIGN PATENT DOCUMENTS

EP 1104195 A2 5/2001
JP 2009-188690 A 8/2009
(Continued)

OTHER PUBLICATIONS

J. Baumgartner, "Comcast Tests Network DVR in Boston", Light Reading, retrieved from the internet at <http://www.lightreading.com/document.asp?doc_id=219785&site=lr_cable>, Apr. 13, 2012.
(Continued)

*Primary Examiner* — Jalatee Worjloh
(74) *Attorney, Agent, or Firm* — Chernoff, Vilhauer, McClung & Stenzel, LLP

(57) ABSTRACT

[A method is disclosed that includes: receiving, via a network digital video recorder, a request to record requested content; receiving, via a network digital video recorder at a first time, the requested content in a first format and the requested content in a second format; storing, via the network digital video recorder, the requested content in the first format; storing, via the network digital video recorder, the requested content in the second format; deleting, from network digital video recorder, the requested content in the second format after a predetermined time period; and transcoding, via an on demand transcoder, the requested content in the first format to the requested content in a third format after the predetermined time period.] *A method is disclosed, including: receiving request to record content; receiving the requested content in a plurality of versions; storing the requested content; from the plurality of versions, identify mezzanine content having a first format and resolution for retaining in storage; for a remaining plurality of versions: determine at least one criterion; retain one or*
(Continued)

*more versions of the remaining plurality of versions in storage until the at least one criterion is met; receiving a request for playback of the requested content to a subscriber's device; determining whether the request may be fulfilled using any stored versions of the plurality of versions of the requested content; if the version having a format and resolution corresponding to the decoding capabilities of the subscriber's device is not stored, regenerate, from a stored version of the plurality of versions, the format and resolution that corresponds to the decoding capabilities of the subscriber's device.*

16 Claims, 8 Drawing Sheets

(51) Int. Cl.

| | |
|---|---|
| ***G11B 20/12*** | (2006.01) |
| ***H04N 21/232*** | (2011.01) |
| ***H04N 21/2343*** | (2011.01) |
| ***H04N 21/2747*** | (2011.01) |
| ***H04N 21/433*** | (2011.01) |
| ***H04N 21/4335*** | (2011.01) |
| ***H04N 21/4402*** | (2011.01) |
| ***H04N 21/472*** | (2011.01) |
| ***H04N 21/258*** | (2011.01) |

(52) U.S. Cl.
CPC ..... *H04N 21/232* (2013.01); *H04N 21/23439* (2013.01); *H04N 21/2747* (2013.01); *H04N 21/4334* (2013.01); *H04N 21/4335* (2013.01); *H04N 21/44029* (2013.01); *H04N 21/47214* (2013.01); *H04N 21/25825* (2013.01)

(58) Field of Classification Search
CPC ..... H04N 21/4335; H04N 21/232; H04N 21/4334; H04N 21/47214; H04N 21/25825; G11B 20/1262
See application file for complete search history.

(56) References Cited

U.S. PATENT DOCUMENTS

| | | | | |
|---|---|---|---|---|
| 8,676,036 | B1 | 3/2014 | Bhogal et al. | |
| 8,843,977 | B2 | 9/2014 | Ruffini et al. | |
| 2004/0010492 | A1 | 1/2004 | Zhao et al. | |
| 2005/0080497 | A1 | 4/2005 | Rao | |
| 2006/0031889 | A1 | 2/2006 | Bennett et al. | |
| 2006/0083434 | A1 | 4/2006 | Inata et al. | |
| 2006/0188020 | A1* | 8/2006 | Wang | H04N 19/56 375/240.16 |
| 2007/0061522 | A1 | 3/2007 | Vink | |
| 2007/0157247 | A1 | 7/2007 | Cordray | |
| 2007/0157260 | A1 | 7/2007 | Walker | |
| 2008/0052026 | A1* | 2/2008 | Amidon | H04N 21/25833 713/1 |
| 2008/0115171 | A1 | 5/2008 | Barsness et al. | |
| 2008/0235733 | A1 | 9/2008 | Heie et al. | |
| 2009/0172742 | A1 | 7/2009 | Weaver | |
| 2009/0254672 | A1 | 10/2009 | Zhang | |
| 2010/0231754 | A1 | 9/2010 | Wang et al. | |
| 2010/0277606 | A1 | 11/2010 | Deluca et al. | |
| 2011/0038613 | A1 | 2/2011 | Buchheit | |
| 2011/0299448 | A1* | 12/2011 | Meier et al. | 370/312 |
| 2012/0117103 | A1 | 5/2012 | Farrelly et al. | |
| 2012/0117339 | A1 | 5/2012 | Kandekar et al. | |
| 2012/0210382 | A1* | 8/2012 | Walker et al. | 725/115 |
| 2012/0224834 | A1 | 9/2012 | Chen et al. | |
| 2012/0265901 | A1* | 10/2012 | Swenson et al. | 709/246 |
| 2013/0014187 | A1 | 1/2013 | Huang et al. | |
| 2013/0129322 | A1 | 5/2013 | Bhogal et al. | |
| 2013/0133009 | A1 | 5/2013 | Bhogal et al. | |
| 2013/0174202 | A1 | 7/2013 | Kim et al. | |
| 2014/0013342 | A1 | 1/2014 | Swan et al. | |
| 2014/0067898 | A1 | 3/2014 | Steiner et al. | |
| 2014/0153907 | A1* | 6/2014 | Farah | H04N 9/7921 386/297 |

FOREIGN PATENT DOCUMENTS

| | | | |
|---|---|---|---|
| WO | 2012/112910 | A1 | 8/2012 |
| WO | 2013/014864 | A1 | 1/2013 |

OTHER PUBLICATIONS

S. Donohue, "Comcase Unveils Blueprint for Network DVR in Patent Application", Fierce Cable, retrieved from the internet at <http://www.fiercecable.com/story/comcast-unveils-blueprint-network-dvr-patent-application/2012-08-29>, Aug. 29, 2012.

PCT Search Report & Written Opinion, RE: Application #PCT/US2014/021640; dated Jul. 4, 2014.

PCT Search Report & Written Opinion, RE: Application No. PCT/US2014/026883; dated Aug. 13, 2014.

Wikipedia, description of Predictive Analytics, URL: <http://en.wikipedia.org/wiki/Predictive_analytics>, Jan. 17, 2013.

* cited by examiner

SYSTEM AND METHOD FOR MULTISCREEN NETWORK DIGITAL VIDEO RECORDING USING ON-DEMAND TRANSCODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[The present application claims priority from U.S. Provisional Application No. 61/798,554, filed Mar. 15, 2015, the entire disclosure of which is incorporated herein by reference.] *This is a reissue application of U.S. patent application Ser. No. 13/857,519 filed on Apr. 5, 2013, now issued as U.S. Pat. No. 10,027,993, which claims the benefit of U.S. Provisional Patent Application Serial No. 61/798,554 filed on Mar. 15, 2013. The entire disclosures of the above applications are hereby incorporated by reference herein for all purposes.*

BACKGROUND

The present disclosure generally deals with network digital video recorders (nDVRs).

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Embodiments disclosed herein relate to a method for reducing storage and transcoding costs in network-based digital video recorder (nDVR) systems.

Many network operators are considering the deployment of a network-based DVR as an alternative to the traditional in-home DVR, e.g., a DVR that is included in a set-top-box (STB). Some of the reasons the nDVR approach is attractive to operators include: it is a more effective way to support DVR content on multiple screens, it allows legacy STBs to support DVR functions, it allows for lucrative upsale opportunities, and it enables a new platform for targeted advertising.

In some cases, the content provider or service provider is required to store each subscriber's recordings uniquely, even in the case where multiple subscribers record the same content. This requirement significantly drives up the storage costs in an nDVR deployment, to the point where those costs may exceed the costs of traditional in-home DVR. This factor is aggravated with support for multiple screens. Multiple screens means multiple formats. If all necessary formats are recorded and stored uniquely for each recording for each subscriber, the storage costs increase even more.

One way to decrease the storage costs of nDVR would be to minimize the number of formats recorded for a given asset (in the minimal case, to record only a single, high quality format). In order to support nDVR on multiple screens, however, the system would have to be able to dynamically transcode content on the fly, to convert the content into a format (i.e., screen resolution) appropriate for the display device. However, this on-demand transcoding is costly, consuming expensive processing resources on a transcoding device.

Thus there is a trade-off between storage costs and transcoding costs, and it is in the interest of network operators to find the optimal (lowest cost) balance between these costs.

Figure 1:
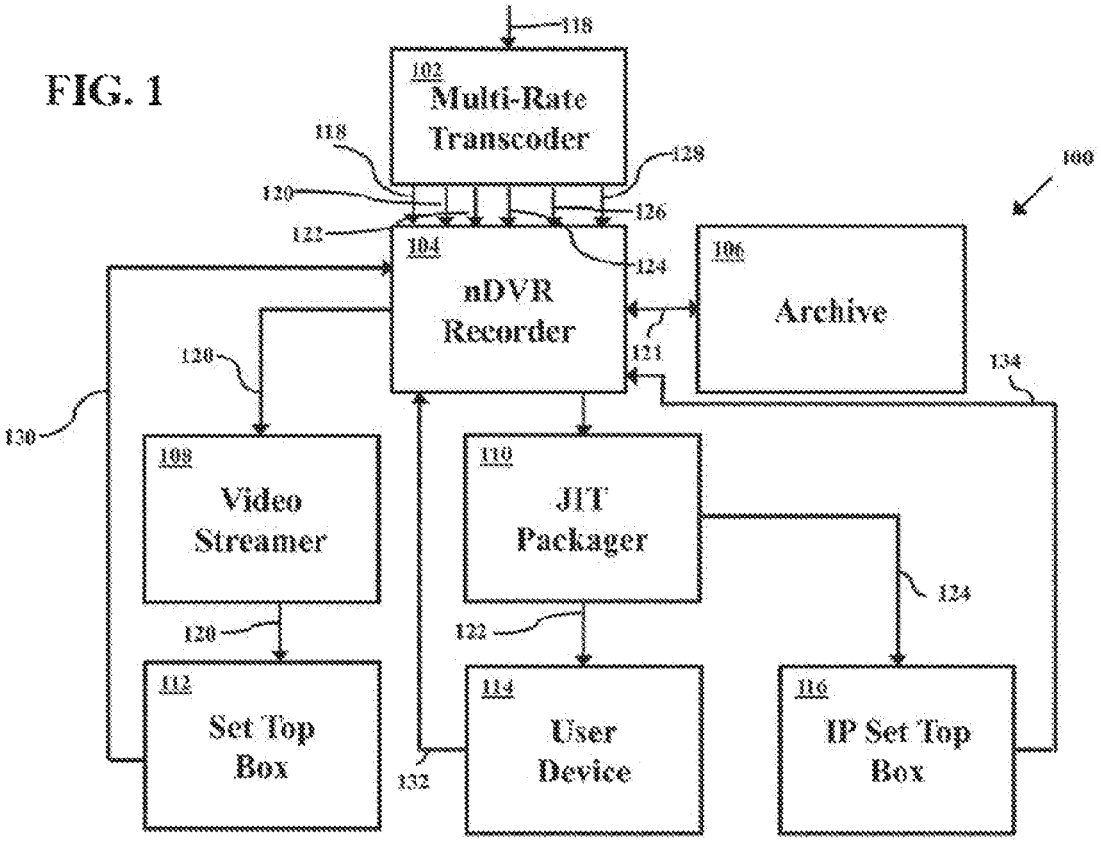
FIG. 1 illustrates a conventional nDVR system.

FIG. 1 illustrates a conventional nDVR system. As shown in the figure, system 100 includes multi-rate transcoder 102, network DVR (nDVR) recorder 104, archive 106, video streamer 108, JIT packager 110, set-top box 112, user device 114 and an Internet Protocol (IP) set top box 116.

Multi-rate transcoder 102 is operable to communicate with nDVR recorder 104 and receive content in one format and change, or transcode, that format into one or more different formats. The original format and the transcoded formats may be any known format, non-limiting examples of which include Moving Pictures Expert Group (MPEG), Adaptive Bit Rate (ABR) in H.264 Advance Video Coding (AVC), H.264/AVC, Scalable Video Coding (SVC) and High Efficiency Video Coding (HEVC). Transcoding becomes necessary when different devices with different format parameters request similar content. In the case of ABR technology, it may be necessary to provide a range of bit-rate/resolutions that a client device may choose from based on network conditions. With respect to different formats, consider an example involving an H.264/AVC scalable video coding standard, which is an extension (Annex G) of the H.264/AVC video coding for video compression. The H.264/AVC standard is a form of MPEG video compression standard based on motion-compensation. Motion-compensation is a technique often used in video compression in which a frame is described in terms of the transformation with respect to a reference frame. The reference frame may be previous in time or even from the future. SVC allows for spatial, temporal, and quality scalabilities. Spatial scalability and temporal scalability describe cases in which subsets of the bit stream represent the source content with a reduced picture size (spatial resolution) or frame rate (temporal resolution). The quality scalability of SVC provides bitrate transfer scalability, or multi-rate transmissions, which is useful in network resource management. Multi-rate transcoder 102 may be able to generate multiple formats of an originally formatted content in accordance with ABR in H.264/AVC, H.264/AVC, SVC, or new compression standards like HEVC. AVC is a standard for video compression, and is a format used for recording, compression and distribution of high definition video. HEVC is a video compression standard that is said to improve video quality, double the data compression ratio as compared to H.264/MPEG-4AVC, and can support resolutions up to 8192×4320. It may be noted that ABR has emerged as a better alternative for providing quality scalability based on network conditions and available network bandwidth.

nDVR 104 is operable to record and store content based on requests for content made by users, or subscribers. nDVR 104 communicates with multi-rate transcoder 102, archive 106, video streamer 108, JIT packager 110, set top box 112, user device 114 and IP set top box 116.

Archive 106 is a data storage device operable to save copies of content. Archive 106 may include physical storage and/or memory media such as RAM, ROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. Archive 106 is shown as a separate entity in FIG. 1, however it is possible that archive 106 is part of nDVR 104.

Video streamer 108 is operable to communicate with nDVR 104 and set top box 112. Video streamer 108 may be any conventional streaming system that delivers the content from nDVR 104 and delivers it to set top box 112.

JIT (just-in-time) packager 110 is operable to communicate with nDVR 104, user device 114 and IP set top box 116. JIT packager 110 serves to provide ABR content to devices that can accept the format, such as a proprietary smart phone, a game console client, or Smart TV client.

Set top box 112 is operable to connect to a television to deliver television services through traditional terrestrial, satellite and cable formats. Set top box 112 may have a graphic user interface (GUI) that can be accessed by the user via the television to which set top box 112 is connected.

User device 114 can be any device that may use ABR content, such as mobile phones, tablet computers, gaming systems, etc. User device 114 may have a GUI that can be accessed by the user via the screen on the device.

IP set top box 116 is operable to connect to a television to deliver television services over the Internet instead of being delivered through traditional terrestrial, satellite and cable formats. IP set top box 116 may have a GUI that can be accessed by the user via the television to which IP set top box 116 is connected.

In operation, when a user wants to record some content, the user may interact with the GUI on either set top box 112, user device 114 or IP set top box 116 to choose what content may be recorded. Content can be any type of video or audio media, such as movies, television shows, music, radio, etc. The GUI on either set top box 112, user device 114 or IP set top box 116 may communicate with nDVR recorder 104 to notify it that some content is desired.

In the case of viewing live content, the content is always flowing to multi-rate transcoder 102, and there is no communication from nDVR 104 to a content server (not shown). nDVR 104 records content as provided by multi-rate transcoder 102. Once recoded, the content pulled from storage (not shown) within nDVR 104 for playback via streamer 108 or JIT packager 110.

In the case that the content is not live, nDVR recorder 104 may request the content from the content server (not shown), which may send the content to multi-rate transcoder 102.

The content provider may then transmit the content 118 to multi-rate transcoder 102. Typically, content 118 is provided in a mezzanine format, which is the format having the highest quality, and thus consuming the largest bitrate for transmission. Not all end user devices may be able to decode the content in the format provided by the content provider. In fact, there may be many different formats to support just as many different end user devices. For this reason, multi-rate transcoder 102 can transcode the content from the original format as provided by the content provider into a plurality of other formats of varying quality and corresponding bitrate. These many transcoded formats of the original content may be viewed, as requested, for a corresponding user device.

For purposes of discussion, in this example, presume that the copies of content 118 as stored on nDVR 104 include: content 118 in the mezzanine format, content 120 having an MPEG-2 format and having a transmission bit rate of 15 Mbits per second (Mbps); content 122 having an adaptive bit rate (ABR) format with a resolution of 512×288 and having a transmission bit rate of 0.94 Mbps; content 124 having an ABR with a resolution 640×360 and having a transmission bit rate of 1.17 Mbps; content 126 having an ABR with a resolution of 720p30 and having a transmission bit rate of 3.50 Mbps; and content 128 having an ABR with a resolution of 720p60 and having a transmission bit rate of 6.25 Mbps.

Content 118 and all formats of content 118 as transcoded by multi-rate transcoder 102 are stored on nDVR 104. In this example therefore, nDVR 104 will store contents 120, 122, 124, 126, and 128.

When the user desires to watch "the recorded content," the user in actuality want to watch a version of content 118, which may be any one of contents 118, 120, 122, 124, 126, and 128. The choice of which version of content 118 will be watched depends on the device with which the user will use. For purposes of discussion, presume the user and to watch the content on set-top box 112. In such a case, the user interacts with a GUI (not shown) set top box 112 to send a request to nDVR 104 that content 118 needs to be retrieved. The request from set-top box 112 includes information relating to the decoding capabilities of set-top box 112. As such, nDVR 104 is able to determine what format of content should be provided. For purposes of discussion, presume that set-top box 112 is able to decode content in MPEG-2 format and having a transmission bit rate of 15 Mbps. In such a case, nDVR 104 will send content 120 to video streamer 108 for delivery to set-top box 112.

On the other hand, if the user wants to watch a version of content 118 on user device 114, the user interacts with a GUI (not shown) user device 114 to send a request to nDVR 104 that content 118 needs to be retrieved. The request from user device 114 includes information relating to the decoding capabilities of user device 114. As such, nDVR 104 is able to determine what format of content should be provided. For purposes of discussion, presume that user device 114 is able to decode content in ABR with a resolution 640×360 and having a transmission bit rate of 1.17 Mbps. In such a case, nDVR 104 will send content 124 to JIT packager 110 for delivery to user device 114.

It should be noted that in the case of ABR, the requested format may change based on network conditions. For example, user device 114 may initially request 640×360, and then may request 512×288 for the next segment or segments, and then may go back to 640×360 and so on based on available network bandwidth.

Now suppose that the user wants to watch a version of content 118 on IP set top box 116, the user interacts with a GUI (not shown) IP set top box 116 to send a request to nDVR 104 that content 118 needs to be retrieved. The request from IP set top box 116 includes information relating to the decoding capabilities of IP set top box 116. As such, nDVR 104 is able to determine what format of content should be provided. For purposes of discussion, presume that IP set top box 116 is able to decode content in an ABR format with a resolution of 512×288 and having a transmission bit rate of 0.94 Mbps. In such a case, nDVR 104 will send content 122 to JIT packager 110 for delivery to IP set top box 116.

If the content is stored within nDVR 104 for an extended period of time, the content may be moved to archive 106, where it can be retrieved if and when the user chooses to watch it. Specifically, since a user may wish to watch a recorded program at an unspecified future time, nDVR 104 stores all versions of content 118 in archive 106. Accordingly, as discussed above, when a device requests content from nDVR 104, nDVR 104 first retrieves the correct version of the content from archive 106. nDVR 104 then provides the correct version to the particular user device.

As mentioned above, there are costs associated with storing content, wherein those costs are directly related to the size of the content being stored. Further, the cost of storing one content aggregates as the number of formats for that content are stored. In other words, the costs to store all versions of content 118 include the cost to store content 118, 120, 122, 124, 126 and 128. A portion of this cost is wasted for any of content 118, 120, 122, 124, 126 and 128 that is not subsequently watched by the user.

Aspects in accordance with the present disclosure provide a more cost effective mechanism for storing/transcoding content for multi-screen system.

Figure 2:
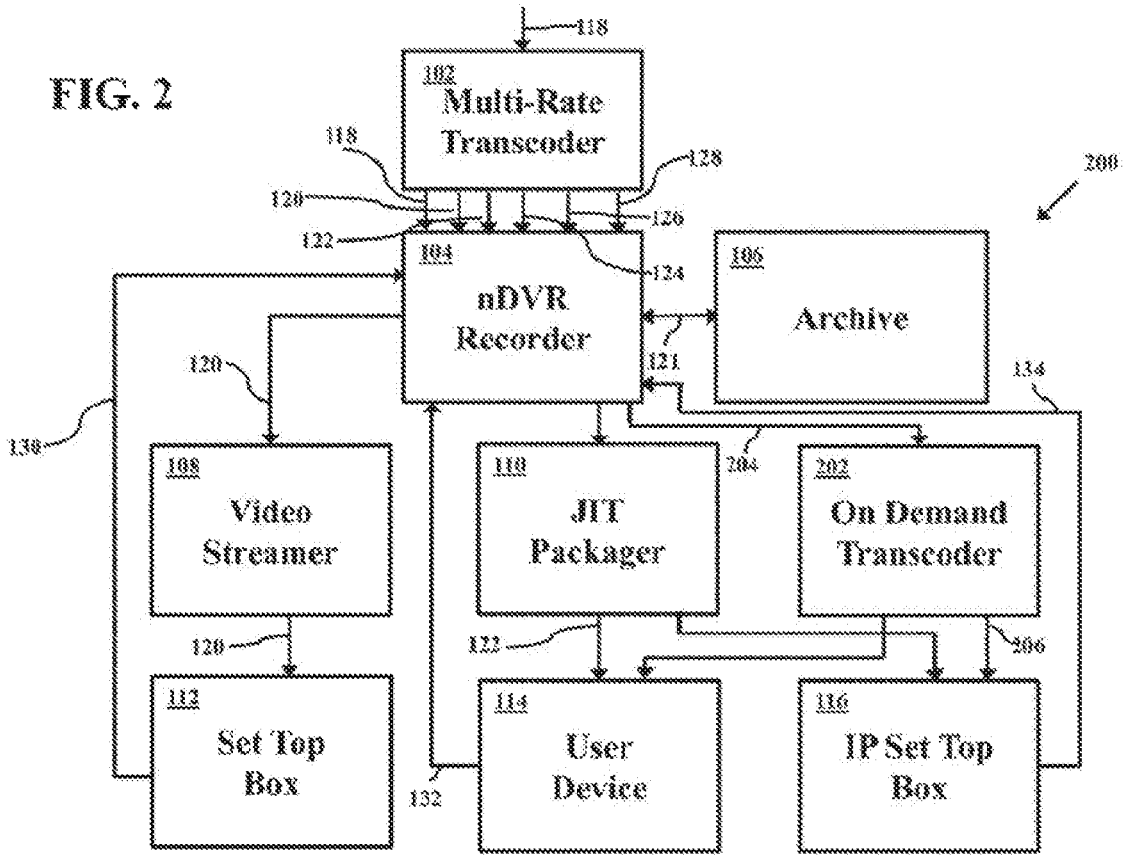
FIG. 2 illustrates a nDVR system.

FIG. 2 illustrates another nDVR system.

As shown in the figure, system 200 includes all of the items in system 100 with the addition of on-demand transcoder (ODT) 202.

As mentioned with respect to FIG. 1, when content has been stored in nDVR 104 for an extended period of time, it is moved to archive 106. The time at which content is moved to archive 106 may be user defined, or the user may choose to have system 200 determine the appropriate time at which to move content.

In general, the likelihood of watching content decreases as time elapses after recording the content. For example, the probability of content being watched 3-5 days after it is recorded is much lower than the probability of content being watched one day after it is recorded. For purposes of explanation and brevity, assume the content is moved to archive 106 after it has been stored in nDVR 104 for five days without being watched.

In some embodiments, when content is moved to archive 106, only the highest quality format (the mezzanine format) is saved in order to decrease the cost associated with storage. These costs will be further described with reference to FIGS. 3-4.

Figure 3:
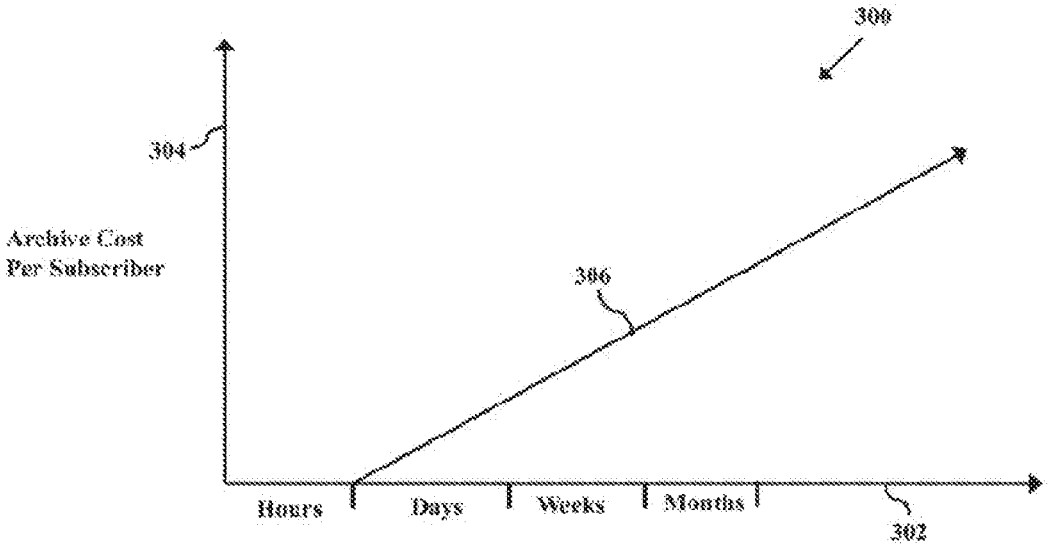
FIG. 3 illustrates a chart showing the cost of conventionally storing content over time.

FIG. 3 illustrates a chart showing the cost of conventionally storing content over time.

As shown in the figure, chart 300 includes age of archived time axis 302, archive cost per subscriber axis 304 and cost line 306.

Cost line 306 represents the fixed cost associated with storing all versions of content 118, i.e., contents 118, 120, 122, 124, 126, and 128. This linearly increasing cost increases over time, irrespective as to whether the likelihood of watching the content decreases.

Aspects of the present disclosure account for the likelihood of watching specific formats of content overtime in order to decrease storage costs. This will now be discussed with reference to FIG. 4.

Figure 4:
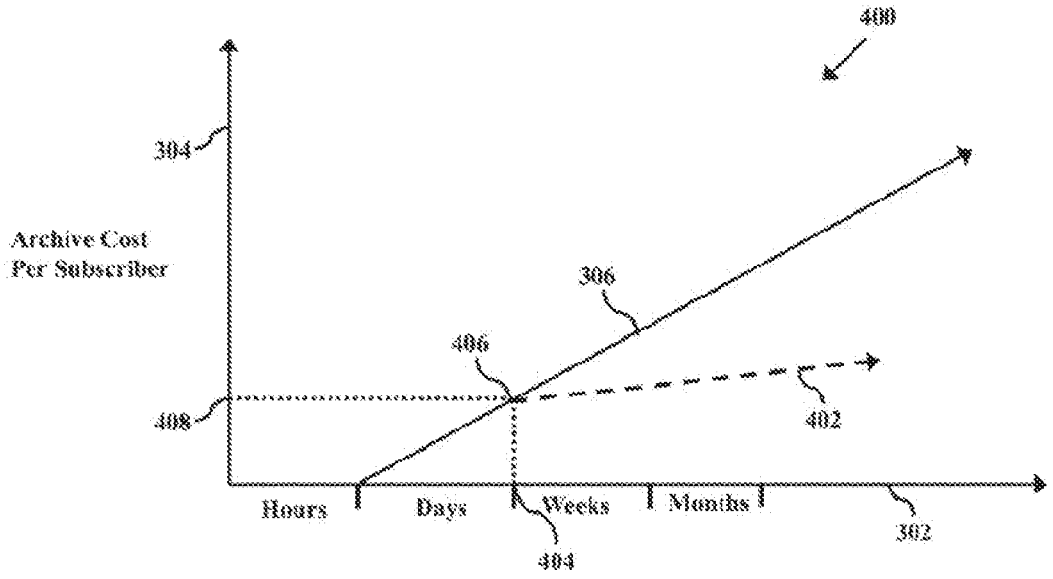
FIG. 4 illustrates a chart showing the difference in cost of storing content over time.

FIG. 4 illustrates another chart showing the difference in cost of storing content over time.

As shown in the figure, chart 400 includes all of the items described with reference to FIG. 3, in addition to cost line 402.

Cost line 402 represents the fixed cost associated with storing only content 118, and not storing the remaining versions of content 118, i.e., contents 120, 122, 124, 126, and 128. Because contents 120, 122, 124, 126, and 128 are not stored, the associated costs are saved. As such, the slope of cost line 402 is much lower than the slope of cost line 306.

In this example, presume that contents 118, 120, 122, 124, 126, and 128 are stored for three days. As such, the cost associated therewith will be described via cost line 306. On the third day, indicated by 404 on archived time axis 302, the cost is indicated by an intersecting point 406 to have a value as indicated by 408 on archive cost per subscriber axis 304. Then contents 120, 122, 124, 126, and 128 are no longer stored and the associated costs therewith are saved. Therefore the total cost savings can be shown as, A, the difference between cost line 306 and cost line 402.

In other words, with this aspect, once a plurality of versions of content have been stored on nDVR 104 for a period of time without being watched, some versions of the content may deleted. In an example embodiment, once a plurality of versions of content have been stored on nDVR 104 for a period of time without being watched (for example, five days), all lower quality versions of the content are deleted and the higher quality content is moved to archive 106 for future viewing, if desired. By storing only one version of the content instead of all versions of the content, the cost associated with storage decreases dramatically, as discussed above with reference to FIG. 4.

Returning to FIG. 2, if the user wants to view content more than five days after recording, in an example embodiment, only the highest quality version, content 118, is available on archive 106. If the user requests content 118 to be viewed on a device that supports the format of content 118, for example set top box 112, then content 118 is provided.

Alternatively, consider the situation after more than five days after recording, wherein contents 120, 122, 124, 126, and 128 have been removed from archive 106, and where the user requests content 118 to be viewed on a device that does support the format of content 118, for example user device 114. In such a case, when the request for content is made, nDVR 104 will recognize that user device cannot support the format of 118. nDVR 104 is additionally aware that no other formats of content 118 are stored in archive 106 because more than five days have passed since the recording. nDVR 104 will recognize that user device 114 can only decode content in the ABR format with a resolution 640×360 and having a transmission bit rate of 1.17 Mbps. nDVR 104 will therefore retrieve content 118 from archive 106 and send it to ODT 202 with instructions to transcode content 118 into an ABR format with a resolution 640×360 and having a transmission bit rate of 1.17 Mbps. ODT 202 may then transcode content 118 into the ABR format with a resolution 640×360 and having a transmission bit rate of 1.17 Mbps.

As discussed above, in some examples, nDVR 104 may determine what bit-rate/resolution user device 114 desires and may instruct ODT 202 deliver the content in that bit-rate/resolution. However, in other examples, ODT 202 may be able to determine what bit-rate/resolution user device 114 desires, and then deliver the content in that bit-rate/resolution.

As discussed above, the likelihood of watching a program decreases as time goes on, and thus the likelihood of having to transcode content via ODT 202 decreases as well. The costs associated with transcoding will be further described later.

Figure 5:
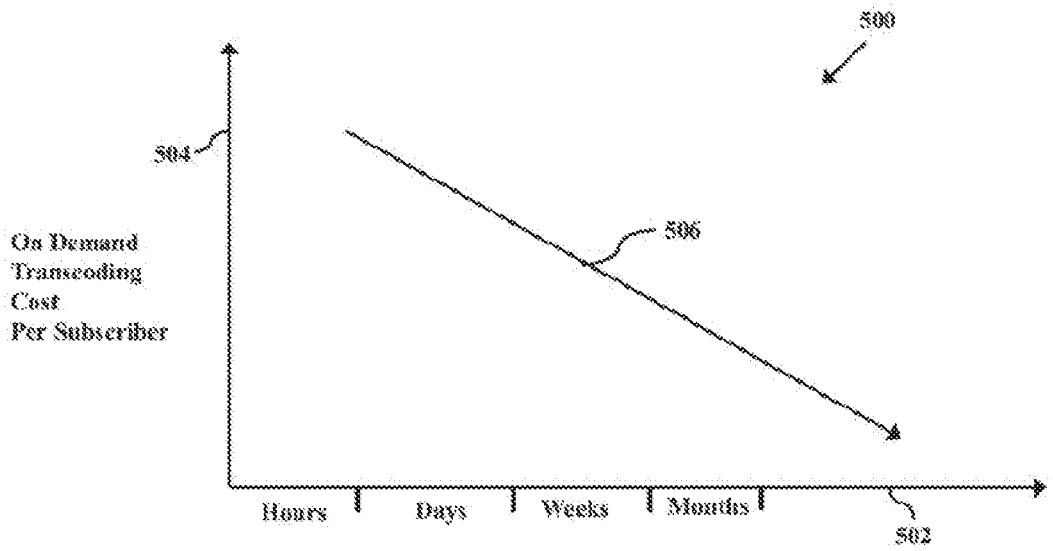
FIG. 5 illustrates a chart showing the cost of on demand transcoding content over time.

FIG. 5 illustrates a chart showing the cost of on demand transcoding content over time.

As shown in the figure, chart 500 includes on demand transcoding (ODT) cost per subscriber axis 504, age of archived content axis 502 and ODT cost line 506.

ODT cost line 506 represents cost associated with transcoding content 118. Here, there is a presumption that the likelihood of watching content 118 decreases over time. For example, if a baseball game is recorded, and is not watched within two days, the likelihood that the recorded baseball game will be watched greatly decreases. Further, if the likelihood of watching content 118 decreases over time, the likelihood of watching another format of content 118, e.g., any one of contents 120, 122, 124, 126, and 128, additionally decreases over time. As such, the slope of ODT cost line 506 is negative.

Figure 6:
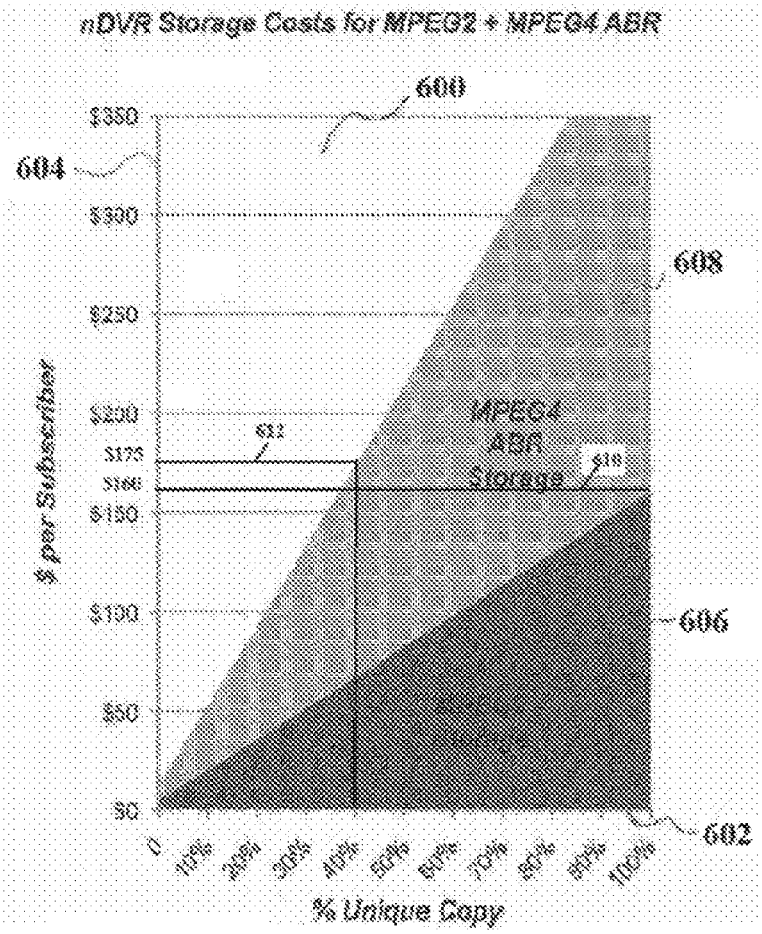
FIG. 6 illustrates a chart showing the cost of conventionally storing different content formats.

FIG. 6 illustrates a chart showing the cost of conventionally storing different content formats.

As shown in the figure, chart 600 includes a percent unique copy axis 602, a cost per subscriber axis 604, a portion 606 and a portion 608.

In this example, portion 606 corresponds to the storage costs for storing content 118. As more subscribers store a copy of content 118, the cost increases. As shown by line 610, if 100% of the subscribers store only copy of content 118, and no copies of contents 120, 122, 124, 126, and 128, the cost is $160.

Portion 608 corresponds to the storage costs for storing content 118 and addition contents 120, 122, 124, 126 and 128. As more subscribers store a copy of content 118, the cost increases. As shown by line 612, if only 40% of the subscribers store a copy of content 118 and also store contents 120, 122, 124, 126 and 128 the cost is $175, which is $15 more than if everyone had only one copy of content 118. Another way of considering the savings, consider the situation where 60% of subscribers store a copy of all the content, which would cost approximately $210. This would be approximately $50 more than if everyone had only one copy of content 118.

As discussed above, aspects of the present invention decrease overall costs by removing statistically unneeded formats of content. This will be further discussed with reference to FIG. 7.

Figure 7:
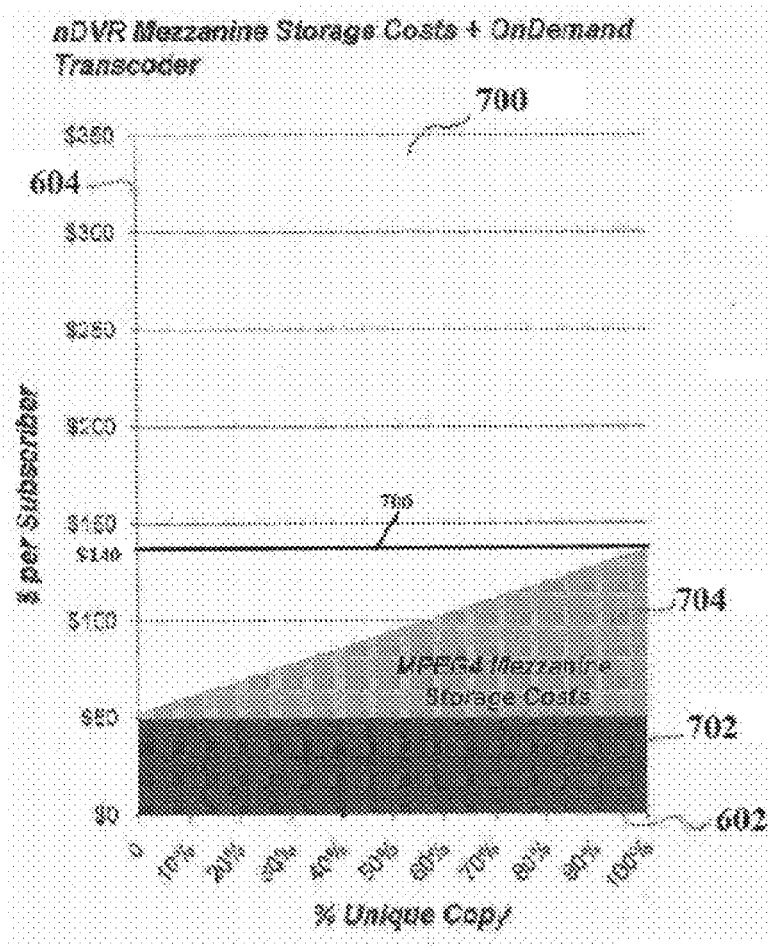
FIG. 7 illustrates a chart showing the cost of storing content.

FIG. 7 illustrates a chart showing the cost of storing content.

As shown in the figure, chart 700 includes the same axes as chart 600, a portion 704 and a portion 702.

When some example embodiments are implemented, only the mezzanine format is stored on archive 106, thus the cost of storing the mezzanine formats will increase as more content is stored in archive 106, as shown by the upward slope of mezzanine storage cost 704. The cost to transcode a piece of content at the time playback is requested is constant and does not increase based on the number of pieces of unique content are stored in archive 106, as indicated by the horizontal ODT cost 702.

As shown by line 706, if 100% of subscribers retain a copy of the mezzanine format on archive 106, the total cost, which includes the ODT cost 702, is only $140. In other words, for $140, each subscriber will be able to obtain a mezzanine copy of the content. Further, with this $140, each subscriber will be able to transcode the mezzanine content into another format. As compared to FIG. 6, the cost associated with line 706 is still less than the cost associated with line 610, which only includes the mezzanine format.

An example method of providing nDVR services with on demand transcoding will now be described with greater detail to FIG. 8.

Figure 8:
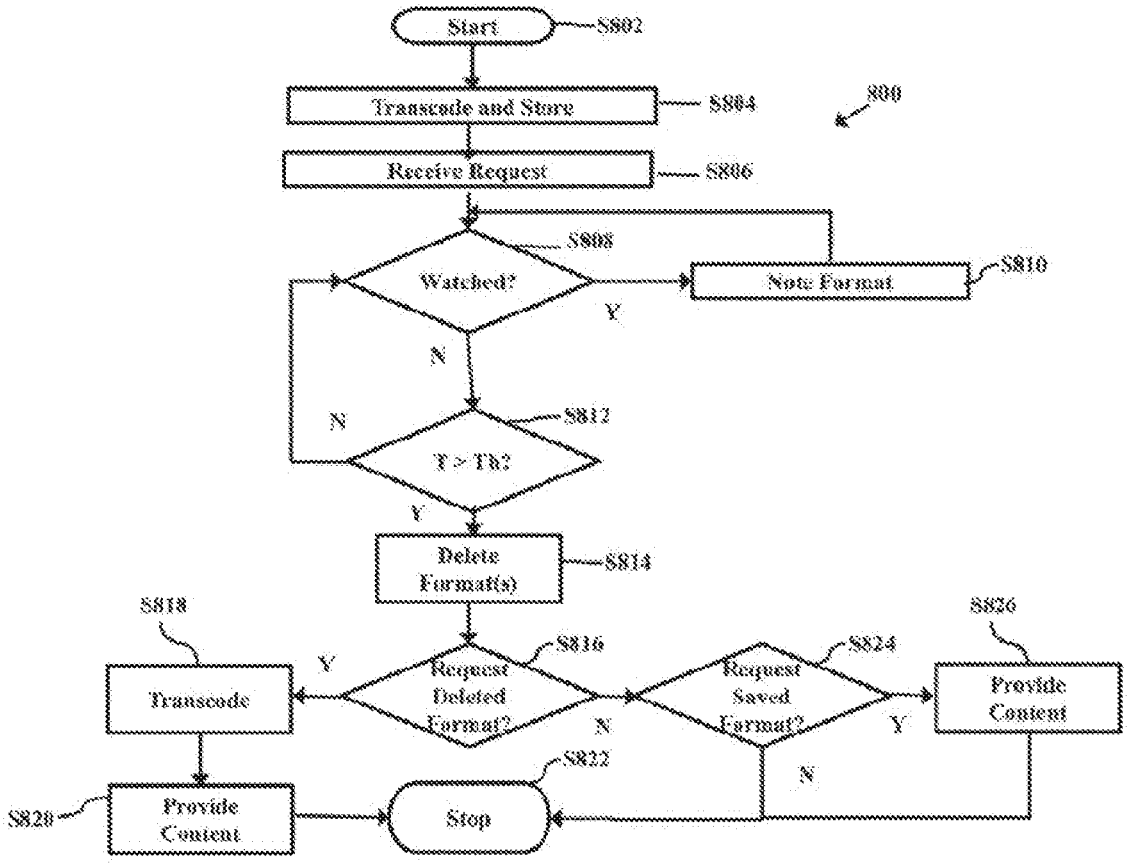
FIG. 8 is a flowchart of an example method of nDVR services with on demand transcoding in accordance with aspects of the present disclosure.

FIG. 8 is a flowchart of an example method 800 of nDVR services with on demand transcoding in accordance with aspects of the present disclosure.

Method 800 starts (S802) and content is transcoded and stored (S804). For example, as shown in FIG. 2, content 118 is provided to multi-rate transcoder 102. Multi-rate transcoder 102 provides content 118 and multiple other formats of content 118 to nDVR recorder 104. Here, content 118 is provided in first format. In an example embodiment, the first format is a mezzanine format. The multiple formats provided by transcoder 102 are based on the first format.

Then a request to store the content is received (S806). For example, as shown in FIG. 2, user device 114 may request, via signal 132, nDVR 104 to record content 118. In some cases, the request to store content 118 may be while a user is watching content 118, e.g., the user wants to be able to watch content 118 again in the future. In some cases, the request to store content 118 may be before content 118 is delivered (i.e., S804 and S806 are switched), e.g., the user by way of a programming guide can see that content 118 will be played in two days. In some cases, content 118, or one of the many other formats as provided by multi-rate transcoder 102, may be provided directly to user device 114 upon receipt. In some cases, the user of user device 114, may want to watch the content at a later time. In such cases, the user may send a request to record the content. At such times, nDVR recorder 104 may store content 118 and the many other formats as provided by multi-rate transcoder 102.

In any event, if a request to store the content was receive, it is then determine whether the content has subsequently been watched (S808). For example, if nDVR recorder 104 has provided content 118, or one of the many other formats as provided by multi-rate transcoder 102, to user device 114 or set top box 112 or IP set top box 116, then the content will have been considered as being watched.

If the content was watched (Y as S808), then the format is noted (S810). For example, if the content was provided to user device 114, then nDVR recorder 104 may note the format as provided. If noted, nDVR recoder 104 may indicated to archive 106 that a format of content 118 for user device 114 was watched. In some embodiments the indication that a format of content 118 had been watched may be used to prompt deletion of all non-mezzanine formats. nDVR recorder 104 then continues to wait for the content to be watched again (return to S808).

If the content was not watched (N as S808), then it is determined whether the time T has surpassed a predetermined threshold Th (S812). The predetermined threshold Th, may be established by any known manner. In some embodiments, the predetermined threshold Th is a static number, whereas in other embodiments, the predetermined threshold Th may be changed. For example, suppose for purposes of discussion that a predetermined threshold Th is set for 3 days. nDVR recorder 104 may determine whether any of content 118, or one of the many other formats as provided by multi-rate transcoder 102, has been watched, e.g., provided to any one of set top box 112, user device 114 or IP set top box 116.

If time has not passed the predetermined threshold (N at S812), nDRV recorder 104 continues to determine whether the content was watched (return to S808).

If time has passed the predetermined threshold (Y at S812), then formats of content 118 are deleted (S814). For example, as mentioned previously, nDVR recorder 104 may store content 118 in a mezzanine format and contents 120, 122, 124, 126, and 128 in their various formats. Further, nDVR recorder 104 may have instructed archive 106 to store content 118 in the mezzanine format and contents 120, 122, 124, 126, and 128 in their various formats.

Storage of all these various formats have an associated increased cost. In accordance with aspects of the present disclosure, some of these formats of content may be deleted from nDVR recorder 104 and/or from archive 106.

In an example embodiment only content 118 in the mezzanine format is retained, and the remainder of the formats are deleted from both nDVR recorder 104 and/or from archive 106, as the case may be.

Returning to FIG. 8, it is then determined whether content is requested in a format that has been deleted (S816). If there is no such request (N at S816) it is then determined whether content is requested in a format that has been saved (S824). If no further requests are made, then method 800 stops (S822).

Suppose however, that a request for content in a saved format is received (Y at S824). In such a case, the content in the saved format is provided (S826). For example, returning to FIG. 2, suppose user device 114 had previously requested via signal 132 a copy of content 124, and accordingly a copy of this content has been retained in archive 106. Now suppose user device 114 again wants a copy of content 124. In such a case, user device 114 would send a request via signal 132 for a copy of content 124. nDVR recorder 104 may then retrieve content 124 from archive 106 via signal 121. nDVR recorder 104 may then send content 124 to user device 114 via JIT packager 110 and signal 122. Method 800 then stops (S822).

Returning to FIG. 8, it is then determined whether content is requested in a format that has been deleted (S816). If there is request for content in a format that has been deleted (Y at S816) then the saved content is transcoded (S818).

For example, suppose that a request for content in a saved format is received. Returning to FIG. 2, suppose IP set top box 116 had not previously requested via signal 134 a copy of content 122, and accordingly a copy of this content has not been retained in archive 106. Now suppose user device 116 wants a copy of content 122. In such a case, user device 116 would send a request via signal 134 for a copy of content 122. nDVR recorder 104 may then retrieve content 120 from archive 106 via signal 121. nDVR recorder 104 may then send content 120 to on demand transcoder 202 via signal 204. nDVR recorder 104 will additionally provide on demand transcoder 202 with instructions to transcode content 120 from the mezzanine format to the format of content 122, which in this example is an ABR format with a resolution of 512×288 and having a transmission bit rate of 0.94 Mbps.

Returning to FIG. 8, the content is then provided. For example, as shown in FIG. 2, on demand transcoder 202 provides content 122 to IP set top box 116 via signal 206. Therefore, on demand transcoder 202 transcodes content from a first format into a second format and then provides the transcoded content in the second format to IP set top box 116. In some embodiments, and with respect to ABR, on demand transcoder 202 is able to generate the right bit-rate/resolution for each client, based on the clients network conditions, As such, on demand transcoder 202 may deliver a better Quality of Experience as compared to having a small number of bit-rate/resolutions for the client to choose from. So, not only may on demand transcoder 202 save network storage cost by not having to store the different bit-rate/resolutions, it can also improve the quality of experience. In particular, the use of on demand transcoder 202 is not limited to a finite set of bitrates and resolutions.

Method 800 then stops (S822).

In summary, implementing example embodiments may serve to decrease the overall costs associated with nDVR systems by only storing a single mezzanine version of content in the archive and only transcoding it as needed, when playback of the archived content is requested.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method comprising:

receiving, at a network digital video recorder in a digital video recorder system, a request to record content;

receiving, at the network digital video recorder, the requested content in a plurality of versions, each version having a respective format and a respective resolution;

storing, via the network digital video recorder, the requested content in the plurality of versions from the plurality of stored versions of content, identify a mezzanine content having a first format and a first resolution for retaining in storage;

for a remaining plurality of stored versions other than the mezzanine content:

determine at least one *criterion related to at least one* of a threshold of time or a comparison of costs at which to delete each of the remaining plurality of *stored* versions;

[if determining based on the threshold of time:

determine at least one threshold in time whether to delete assets from storage, and based on said at least one threshold in time, delete the remaining plurality of versions based on a common time or a respective time for one or more of the plurality of versions;

if determining based on the comparison of costs:

determine a cost for storing each of the remaining plurality of versions over time, determine a cost to transcode each of the remaining plurality of versions from the mezzanine content;

comparing the cost to store a respective one of the remaining plurality of versions to the cost to transcode from the mezzanine content,]

retain *one or more* versions *of the remaining plurality of stored versions* in storage until *the* at least one [of the threshold of time or comparison of costs] *criterion* has been [determined] *met*;

receiving a request for playback of the requested content to a requesting subscriber's device, the request including information related to decoding capabilities of a subscriber's device;

determining whether the request may be fulfilled using any stored versions of the *plurality of stored versions of the* requested content having a format and resolution corresponding to the decoding capabilities of the subscriber's device;

if the version having a format and resolution corresponding to the decoding capabilities of the subscriber's device is stored, deliver the stored version to the requesting subscriber's device;

if the version having a format and resolution corresponding to the decoding capabilities of the subscriber's device is not stored, regenerate from a stored version *of the plurality of stored versions*, having a respective format and resolution, the format and resolution that corresponds to the decoding capabilities of the subscriber's device, the regeneration occurring on demand via an on demand transcoder in the network digital video recorder.

2. The method of claim 1, wherein the remaining plurality of *stored* versions have a lower bit rate and lower resolution than that of the mezzanine content.

3. The method of claim 1, wherein the mezzanine content comprises a highest quality format relative to the remaining plurality of *stored* versions.

4. The method of claim 1, wherein at least one of the remaining plurality of *stored* versions has a second format and a second resolution that *is* derived from the mezzanine content.

5. The method of claim 4, wherein said at least one of the remaining plurality of *stored* versions has a format that is an adaptive bit rate (ABR) format in at least one of H.264/AVC, SVC and HEVC.

6. The method of claim 1, wherein [the] one of the plurality of *stored* versions other than the mezzanine content comprise a highest quality format and resolution.

7. The method of claim 6, wherein it is determined based on the [threshold of time or the comparison of costs] *at least one criterion* to retain the one of the plurality of *stored* versions other than the mezzanine content having the highest quality format and resolution.

8. The method of claim 7, wherein said at least one of the remaining plurality of *stored* versions has a format that is an adaptive bit rate (ABR) format in at least one of H.264/AVC, SVC and HEVC.

9. The method of claim 1, wherein the *at least one criterion related to a* threshold of time determined for deletion of assets from storage includes a respective point in time at which to delete each of the remaining plurality of *stored* versions.

10. The method of claim 1, wherein the determination of the at least one *criterion related to a* threshold in time whether to delete assets from storage includes determining to retain at least one of the remaining plurality of *stored* versions and deleting at least another one of the remaining plurality of *stored* versions.

11. The method of claim 1, wherein the remaining plurality of *stored* versions are deleted at the same time.

12. The method of claim 1, wherein it is determined based on the *at least one criterion related to a* comparison of costs to delete one or more of the remaining plurality of *stored* versions.

13. The method of claim 1, wherein all of the remaining plurality of *stored* versions are deleted from content based on *the* at least one [of the threshold of time or the comparison of costs] *criterion*, retaining only the mezzanine content.

14. The method of claim 1, wherein the version having a format and resolution corresponding to the decoding capabilities of the subscriber's device is not stored, regenerating said version from the mezzanine content.

*15. The method of claim 1, wherein the at least one criterion related to a threshold of time is met when one version of the plurality of versions is watched.*

*16. The method of claim 1, wherein the at least one criterion related to a threshold of time is met when a predetermined time elapses since storing the requested content in the plurality of versions.*

* * * * *